Jan. 25, 1927.
J. R. VAN TASSEL
1,615,601
LENS FRAME MEASURING AND EXPANDING DEVICE
Filed March 8, 1921
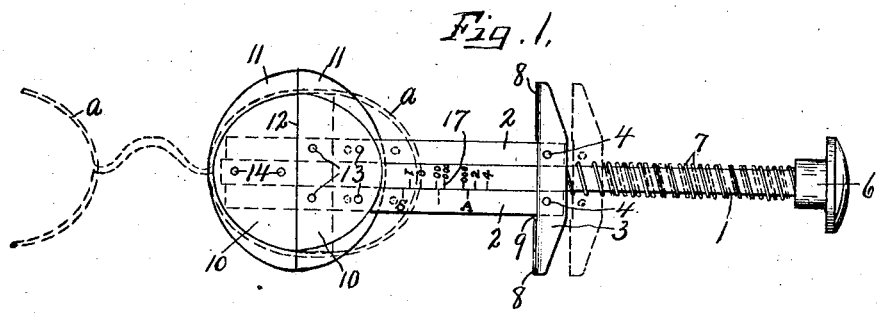

Patented Jan. 25, 1927.

1,615,601

UNITED STATES PATENT OFFICE.

JOHN R. VAN TASSEL, OF GENEVA, NEW YORK, ASSIGNOR, BY MESNE ASSIGNMENTS, TO THE STANDARD OPTICAL COMPANY, OF GENEVA, NEW YORK, A CORPORATION OF NEW YORK.

LENS-FRAME MEASURING AND EXPANDING DEVICE.

Application filed March 8, 1921. Serial No. 450,658.

This invention relates to a lens-frame measuring and expanding device adapted to be held and operated by hand for measuring the perimetric length and mechanical axes of elliptical or circular lens frames or rims and analogous rings in which the lenses or other objects of standard sizes are to be placed. These lens-rims are made in standard forms and sizes to conform to master patterns, and may be constructed from metal or from non-metallic substance, such as rubber, celluloid or some similar material with or without a metal lining and are usually provided with inner circumferential grooves in which the beveled edges of the lenses are seated when properly assembled.

These lenses are also made of standard sizes and forms to fit snugly in their corresponding frames, which are just sufficiently resilient to permit them to be sprung over and upon the periphery of the lens, and it is, therefore, highly important, particularly in eye-glasses and spectacles that the size of the rims or frames correspond exactly to the size of the lenses which they are adapted to receive, and that both rims or frames are of the same size, and the main object of my present invention is to enable the operator to easily and quickly determine whether or not the frames are of standard size for receiving standard size lenses, and also to determine the relative sizes of both of the frames as used in eye-glasses and spectacles, and if not of the same size to determine the size to which the lens for the smaller frame must be ground to properly fit therein.

Another object is to utilize the same device for slightly expanding the frame to conform to the size of the lens which is adapted to be placed therein.

Other objects and uses relating to specific parts of the device will be brought out in the following description.

In the drawings:

Figs. 1 and 2 are face views of opposite sides of the measuring and expanding device embodying the various features of my invention.

Figs. 3, 4, 5 and 6 are sectional views taken respectively on lines 3—3, 4—4, 5—5 and 6—6, Fig. 2.

As illustrated, this device comprises a main supporting stem —1—, a pair of bars —2— at opposite sides of and parallel with the bar —1— and a cross-bar or handle —3— secured by screws —4— to corresponding ends of the bars —2— and forming what may be termed a sliding-frame movable lengthwise of and upon the bar —1—.

The bar —1— is of considerably greater length than the bars —2— and extends in opposite directions from and beyond the cross-bar —3—, the outer end being provided with a hand-piece —6— and is surrounded by a helical-spring —7— having one end abutting against the inner end of the hand-piece —6— and its other end against the outer edge of the cross-bar —3— for normally extending the bars one upon the other.

The bars —1— and —2— are preferably of the same cross-sectional form and size, in this instance rectangular, and are arranged side by side in substantially the same plane in close proximity and in parallelism so that the bars —2— may slide freely along and upon the bar —1— for a purpose presently described.

The cross-bar —3— is preferably U shaped in cross-section and extends laterally equal distances from opposite sides of the bars —2— to form finger-pieces —8— normally within easy reaching distance by the same hand of the operator engaging the handle —6—, which latter usually rests in the palm of the hand when the device is being used.

The inner edge of the cross-bar —3— is preferably round in cross-section for engagement by the fingers of the operator but the intermediate portion thereof is cut away to form an opening —9— for receiving the adjacent ends of the bars —2— and also the adjacent portion of the bar —1—, which is free to slide endwise in said opening. This construction of the cross-bar permits it to be applied to both faces of the bars —2— for securement thereto or more secure support therefor.

Secured to opposite faces of the bars —1— and —2— are a pair of semi-elliptical plates or jaws —10— and another pair of semi-circular plates or jaws —11—, those of each pair having their straight sides facing each other and normally contacting under the tension of the spring —7— along a divisional line —12— at substantially right angles to the bars —1— and —2—, thereby forming stops for limiting the relative contractile movement of the bars —1— and —2—, one of the semi-elliptical sections —10— and one of the circular sections —11— being secured by bolts or screws —13— directly opposite to each other to opposite faces of the bars —2—, while the other elliptical section —10— and its companion semi-circular section —11— are secured by bolts —14— directly opposite to each other to opposite faces of the bar —1—.

The thickness of these plates corresponds approximately to the thickness of an ordinary lens and the edges thereof are beveled at —16— to correspond to the beveled edges of the lens when ground to fit in the rims, which latter are provided with the usual inner peripheral grooves to receive these beveled edges of the lenses and to retain them in operative position in said frame.

The combined width of the plate-sections —10— lengthwise of the bar —1— is somewhat less than the longer axis of the rim or frame to be measured so as to allow said plate-sections to readily enter the opening in the frame, the same being also true of the plate-sections —11— with reference to their adaptation to the measurement of circular rims or frames.

The plates —10— and —11— are held in slightly spaced relation to the adjacent bars —1— and —2— by means of washers —16— so as to enable the grooves in the frame to be easily registered with the ribs —15— on the edges of the plates without excessive interference with the adjacent surfaces of the bars —1— and —2—.

The opposite faces of one of the bars as —1— are provided with graduations or scales —17— and —18— preferably millimeters calibrated to correspond to standard sizes or master patterns to determine or indicate the size of the frame or rim under test for relative accuracy as compared with a standard or master pattern, and may also be used to indicate the relative accuracy or inaccuracy of the two frames or rims of an eye-glass or spectacle mounting.

It will now be understood that the cross-bar —3— is secured to one end of the bars —2— and that the inner plate-sections —10— and —11— are secured to the same bars a short distance from the other end thereof, the outer plate-sections —10— and —11— being secured to the adjacent end of the bar —1—, which in turn is extended through and some distance beyond the cross-bar —3— for receiving the spring —7— and hand-piece —6— and permitting relative endwise movement of the bar —1— and bars —2— for opening or separating the plates of each pair a sufficient distance to make the desired measurement of the frame or rims under test, after which the hand pressure upon the cross-bar —3— and hand-piece —6— may be released to allow the parts to be retracted to their normal positions by the spring —7—.

In the operation of this device, the frame or rim to be tested is placed by hand around the set of plates —10— or —11— according to the form of the lens under test while the plates are in their retracted positions, the groove in the frame being registered with the beveled peripheral edge of one of the plates, whereupon the movement of the cross-bar —3— and plunger-head —6— toward each other will open the sections against opposite sides of the rim or frame, which serves as the limiting stop to limit said opening movement, at which time, the size of the frame will be indicated by the corresponding scales —17— or —18—. This operation may be repeated for both frames of lens-mounting to determine the relative sizes of the lens-frame, although it is evident that the same device may be used for testing any other ring or open frame either circular or elliptical within the range of either set of plates.

It is also evident that other means may be employed for opening and closing the different sets of plates without departing from the spirit of this invention.

What I claim is:

A device for expanding and measuring the rims of lenses comprising a pair of bars arranged in parallel spaced relation, a cross bar connecting said bars near one end and extending laterally beyond opposite sides thereof to form handles, said cross bar having a guide opening therethrough registering with the space between the bars, rim-engaging plates secured to opposite faces of said bars, a separate bar slidable lengthwise of and between the first-named bars and between said plates and extending through the opening in the cross bar, a handle on one end of the separate bar, and rim-engaging plates secured to opposite faces of the other end of the separate bar to cooperate with the first-named plates.

In witness whereof I have hereunto set my hand this 3d day of March, 1921.

JOHN R. VAN TASSEL.